United States Patent [19]
Munding

[11] 3,772,885
[45] Nov. 20, 1973

[54] METHOD FOR SEPARATION OF A FLUID MONERGOL FOR RUNNING A ROCKET MOTOR

[75] Inventor: German Munding, Bad Friedrichshall, Germany

[73] Assignee: Bolkow Gesellschaft mit beschrankter Haftung, Ottobrum bei Munich, Germany

[22] Filed: July 2, 1970

[21] Appl. No.: 60,967

Related U.S. Application Data
[62] Division of Ser. No. 767,906, Sept. 23, 1968, Pat. No. 3,500,861.

[52] U.S. Cl. ........................ 60/207, 60/218, 60/219
[51] Int. Cl. .............................................. C06d 5/08
[58] Field of Search ..................... 60/206, 207, 218, 60/219, 220; 149/36

[56] References Cited
UNITED STATES PATENTS

| | | | |
|---|---|---|---|
| 2,655,786 | 10/1953 | Carr | 60/207 X |
| 2,648,317 | 8/1953 | Mikulasek | 149/36 |
| 3,230,701 | 1/1966 | Mullen | 60/207 |
| 3,173,247 | 3/1965 | Smith et al. | 60/207 X |
| 3,577,735 | 5/1971 | Schmidt | 60/207 |
| 2,930,184 | 3/1960 | Plescia | 60/218 |

*Primary Examiner*—Benjamin R. Padgett
*Attorney*—McGlew & Toren

[57] ABSTRACT

A method for the separation of a fluid Monergol in order to run a gas generator especially for rocket motors comprises dividing the fluid Monergol mass into a plurality of separate Monergol partial masses, separating one of the masses catalytically in an atomized state, and mixing another of the monergol partial masses in an atomized state with the hot decomposed gases of the first Monergol partial mass which is generated as it is separated catalytically so as to thermally split the second fluid Monergol partial mass.

8 Claims, 4 Drawing Figures

PATENTED NOV 20 1973 3,772,885

INVENTOR
German Munding
by McGlew & Toren
ATTORNEYS

METHOD FOR SEPARATION OF A FLUID MONERGOL FOR RUNNING A ROCKET MOTOR

This is a division of application Ser. No. 767,906, filed Sept. 23, 1968, now U.S. Pat. No. 3,600,861.

An apparatus for carrying out the method of the invention, in one embodiment, includes a housing defining a first injection chamber for injecting a first partial Monergol mass and which is connected to a catalyzator chamber for flow of the atomized liquid mass therethrough, and a second injection chamber located downstream of the catalyzer chamber into which a second partial Monergol mass is directed into the flow stream of the first catalyzed mass. The construction is such that the flow through the catalyzer is in an axial direction and transversely into the injected stream of the second partial mass for return axial flow and entrance into a thrust nozzle for discharge in a reverse direction. The injection nozzle is advantageously arranged in a ring having vanes for producing the tangential whirling flow of the injected partial Monergol mass.

In another embodiment of the invention, a gas generator housing, includes a double wall closed end with a first injection nozzle arranged toddischarge a first fluid Monergol mass into the inner wallmchamber for flow in an axial direction through the catalyzer arranged as a part of an intermediate ring sector within the housing. The flow of the first mass from the catalyzer is then around a peripheral ring portion between the double walls of the housing and into another ring sector into which a second partial mass is injected. The third partial Monergol mass is added between the wall portions and is directed with the combined first and second partial mass portions in the ring sectors, and flow from the ring sectors is tangentially inwardly to a centrally arranged swirl chamber which opens downwardly or inwardly into a thrust nozzle through which the products are discharged.

SUMMARY OF THE INVENTION

This invention relates, in general, to a method and apparatus for generating gases from a fluid Monergol and, in particular, to a new and useful method and apparatus for generating gases from a fluid Monergol, particularly for running a gas generator such as a rocket motor.

Gas generators especially for rocket motors employing catalytic separation of a fluid Monergol are known. In the known gas generators, the fluid Monergol mass is sent in an atomized state through a catalytic reactor and is separated into separate gases under high heat conditions. In addition to the basic advantages afforded by catalytically operated generators they have the disadvantage that the catalytic equipment to separate the Monergols requires a large amount of space in order to satisfactorily fulfill its requirements. This is particularly important in respect to the construction of rocket engines particularly for air and space travel. In addition, the catalyzator must be made of expensive metals and therefore the equipment is very expensive to manufacture.

In accordance with the present invention, there is provided a high production gas generator for a simple construction and relatively inexpensive and it may be made to a very small size. This is made possible in accordance with the method of the invention by separating a fluid Monergol gas mass into at least two Monergol parts. One of the Monergol parts is separated catalytically in an atomized state. Another of the fluid partial Monergol masses is mixed in an atomized state into the hot separated gases of the first partial Monergol mass and is therefore split by it thermically. A predetermined ratio is chosen between the two Monergol masses based on the consideration that the catalytically separated Monergol mass must be of a large enough proportion so that the heat capacity of the separated gas is sufficient to separate the second partial Monergol mass by thermal reaction.

In a refinement of the invention, it is also proposed that during the splitting of the fluid Monergol mass into more than two partial fluid Monergol parts in which the first partial Monergol mass which is produced catalytically in an atomized state and which is brought into contact with the second partial Monergol mass of a greater volume and which is also in an atomized state, a further fluid Monergol mass is added in the atomized state to the hot cracked gases of the previous two and also in a correspondingly increasing amount so that it is thermically separated by the cracked gases of the previous Monergol masses and so on. In order to achieve an absolute control over the complete separation of the first and second partial Monergol masses, they are directed in the specific atomized amounts contained in the cracked gas through a so-called special safety catalyzator.

An additional feature of the invention method and apparatus is that it permits the previously cracked partial Monergol masses to be brought into engagement with a newly introduced partial Monergol mass in the form of a tangential whirling stream. For this purpose, an apparatus comprises, for example, a gas generating chamber housing having an exterior chamber into which the first Monergol mass is introduced. It is arranged so that it will flow through an annular catalyzer chamber and in an axial direction and then transversely through a ring member having tangential blades so that it is whirled into association with a second partial Monergol mass which is introduced at this location. Both gaseous products have been directed in an opposite axial direction and are reversed for flow and discharge out through a nozzle section in the form of thrust gases. Each successive partial Monergol mass is introduced by a nozzle providing for the atomization of the partial Monergol mass.

In accordance with another embodiment of the invention, the gas generator includes an annular catalytic ring sector arranged at a location spaced from the inner wall of a reactor of generator housing. The ring sector is divided up into a plurality of individual partial sectors. A first Monergolic mass is introduced, for example, in a manner such that it will flow through one of the catalytic ring sector portions and thence outwardly through this sector portion after some axial flow for contact by a second Monergolic partial mass which is introduced by an injector disposed in a chamber around the catalytic ring. The combined gases of the first and second partial Monergol masses are then directed into a partial ring sector which is referred to a safety catalyzator. The combined products are moved in a whirling direction and a further third Monergolic partial mass is added prior to a third pass through a sector portion of the catalyst mass. The resultant products are directed tangentially into a central whirling chamber which opens at one end to a chamber having a thrust nozzle discharge.

Accordingly, it is an object of the invention to provide a method for the separation of a fluid Monergol to run a gas generator, especially for rocket motors comprising dividing a fluid Monergol mass into at least two separate Monergol partial masses, separating one of said partial masses catalytically while in an atomized state, directing a second fluid Monergol partial mass in an atomized state into the hot decomposed gases of the first partial Monergol mass so as to be intermixed therewith and thermally split by it.

A further object of the invention is to provide an apparatus for generating gas which comprises a housing having a closed end with means for introducing a first Monergolic mass into an injection chamber in an atomized state, the injection chamber being connected to a catalyst chamber through which the first partial Monergol mass is directed, means for introducing a second partial Monergol mass into the hot gases generated in the catalyst chamber by the first partial Monergol mass, and a thrust nozzle arranged to receive the combined gases and for discharging them outwardly.

A further object of the invention is to provide a generator which includes a plurality of separate catalyst chambers with means for successively introducing partial Monergol masses such that each in succession flows through a partial chamber and is then removed passed the injection means for another, with means for tangentially moving the hot gases which are generated so that they intermix with the next injection of the Monergol mass so that the hot decomposed gases cause a spliting of the newly introduced mass, and including one or more means for adding additional partial Monergol masses and for directing the combined decomposed gases through a whirling chamber for directing the gases outwardly through a thrust nozzle.

A further object of the invention is to provide an apparatus for generating gases which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

DETAILED DESCRIPTION OF THE PREFERRED EMBODIMENTS

Figure 1:
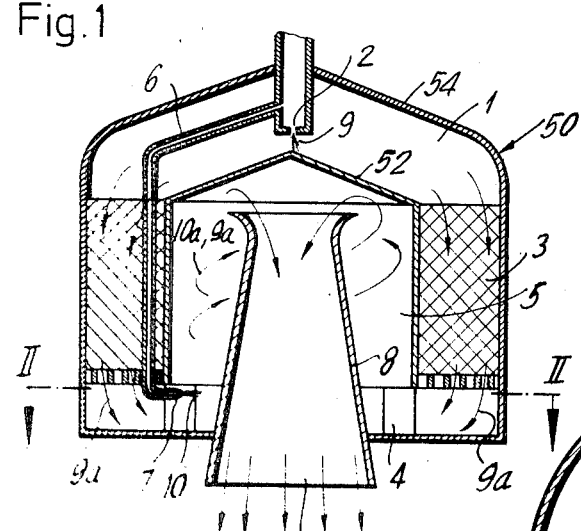
FIG. 1 is a transverse sectional view of a gas generator for a rocket motor constructed in accordance with the invention.

Referring to the drawings, in particular, the invention embodied therein in FIG. 1, comprises a gas generator housing and rocket engine generally designated 50 having spaced inner and outer walls 52 and 54 and a central nozzle forming member 8. The nozzle has an opened discharge end 8a, but the walls 52 and 54 or continuations thereof substantially close the remaining portion of the gas generator rocket engine 50.

In accordance with the invention, an injection chamber 1 is provided for a first Monergol mass in a location adjacent the end remote from the nozzle discharge 8a. Into the space 1, the first Monergol mass is directed by the discharge from injection nozzles 2 in an atomized state.

The chamber 1 communicates to an annular passage having a catalyst or a catalyzator passages 3. The atomized Monergol mass 9 flows through the catalyzator 3 and is separated into individual gases and under high heating conditions cracked gases 9a are created.

Figure 2:
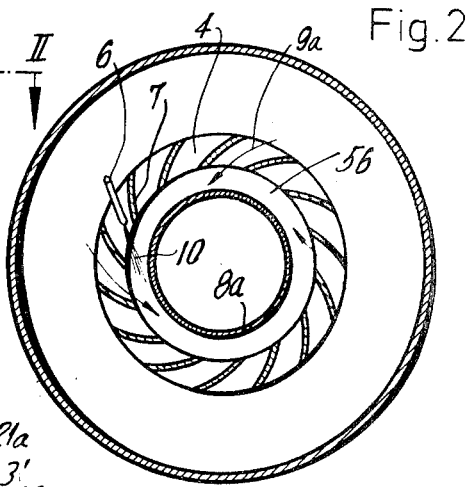
FIG. 2 is a section taken on the line II—II of FIG. 1.

A nozzle ring 4 is located adjacent the discharge end 8a of the nozzle at a location around the nozzle walls and in a position to receive the gases 9a to permit them to be directed as indicated by the arrow in FIG. 2 tangentially into an annular chamber 56 located at the lower end of the housing 50 as indicated in FIG. 1. A second partial Monergol mass is introduced through a feed line 6 and an injection nozzle 7 into the annular chamber 56 in the stream of gases 9a. The hot gases 9a which are accelerated by the nozzle ring 4 contact the second partial Monergol mass 10 and are mixed with it into the tangential movement thereof. The two gaseous mediums produced, 9a and 10a, move tangentially upwardly around the nozzle wall 8 as indicated by the arrows in FIG. 1. The space between the nozzle 8 and the wall 52 defines a cyclone chamber 5. The atomized second Monergol mass 10 is added at a location within the confines of the periphery of this whirling stream until the added Monergol mass is thermically separated. Adjacent the concial end portion of the wall 52 the combined gases reverse and flow outwardly through the thrust nozzle 8 and are discharged through the opening 8a.

Figure 3:
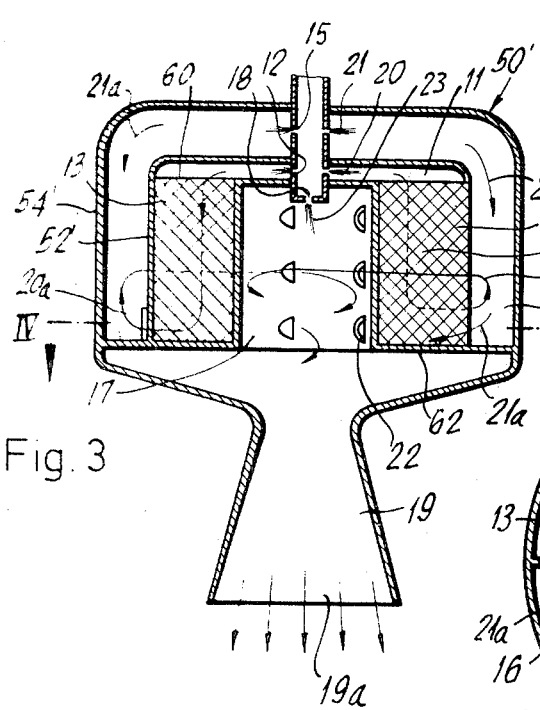
FIG. 3 is a view similar to FIG. 1 of another embodiment of the invention.
Figure 4:
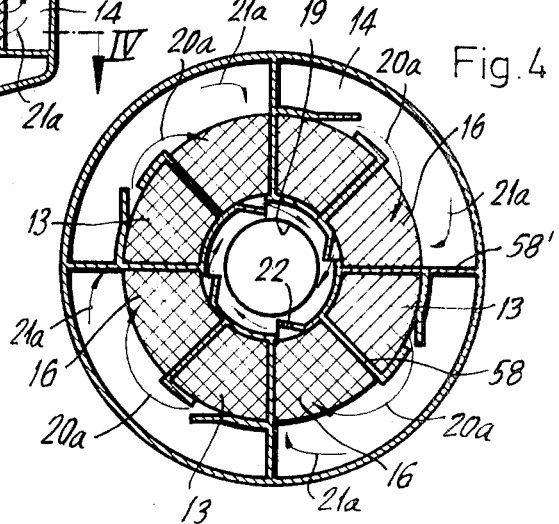
FIG. 4 is a section taken on the line IV—IV of FIG. 3.

In the embodiment indicated in FIGS. 3 and 4, there is provided a gas generator rocket engine generally 50'. This generator 50' also includes spaced inner and outer walls 52' and 54'. In this embodiment, a catalyzator 3' is located on the interior of the inner wall 52' and it is advantageously divided up into a plurality of individual segments or compartments by radial walls 58. A first injector chamber 11 is defined between an end portion of the inner wall 52' and an end wall 60 of the catalyzator 3'. A first injection nozzle 12 is provided for injecting a first partial Monergol mass into the injection chamber 11 which communicates with a ring sector 13 of the catalyzator 3'.

Full radial walls 58' divide the section between the interior walls 52' and 54' into four annular sectors including a second mixing chamber portion 14 into which a second injector nozzle 15 directs a second partial Monergol mass. The flow of the gases from the second mixing chamber 14 is through a second catalyzator 16 and into a cyclone 17 arranged centrally within the catalyzator 3'. Swirl impellers 22 are located between the various sectors to impart a swirl to the gases as they enter the cyclone 17. A third injection nozzle 18 is located to discharge a third partial Monergol mass in an axial direction into the cylcone 17. A thurst nozzle 19 connects to the lower End of the cyclone 17 and is provided with an opening 19a for the discharge of the thrust gases.

The atomized Monergol mass 20 which is introduced to the first injection chamber 11 flows through the catalyzator ring section 13 in an axial direction to the opposite end which is closed by a wall 62. During this flow, it is separated into individual mass and under the high heat conditions cracked gases 20a are created. The cracked gases 20a leave in a radial direction from the ring section 13 and enter into the second injection or mixing chamber 14. A second atomized Monergol partial mass 21 is directed into and admixed with the hot cracked gases 20a and is separated thermically by the heat of these gases to form the hot cracked gases 21a.

Both the gases 20a and 21a then flow through the catalyzator ring section 16 which eventually separates the Monergol particles which are still in fluid form. The swirl impellers 22 impart a swirl to the gases 20a and 21a which flow into the cyclone 17. Into this swirl stream, a third Monergol partial mass 23 is injected by the nozzle 18 and it is separated by the heat of the gases 20a and 21a. The thrust nozzle 19 is fed by the aerodynamic and thermal-dynamic conditions inside the chamber 22 from the center of the swirling stream; remaining Monergol drops 23 are kept within the confines of the periphery of the swirl stream until they are thermically separated.

If, as Monergol hydrazine is used, then the mixing ratio of the first and second Monergol masses 9 and 10 is maintained about 1:2 for the embodiments of FIGS. 1 and 2. This means, that only about a third of the entire Monergol mass is fed through the catalyzator 3. Therefore, this catalyzator 3 can be of a considerably smaller dimension than the usual gas generator elements. The heat of the gases of the first Monergol partial mass 9 consisting of only a third of the entire Monergol mass is sufficient to separate thermically the remaining two thirds of the partial Monergol mass which is introduced at the second injection.

In the embodiment according to FIGS. 3 and 4, if a hydrazine is also used, only about 11 percent of the entire Monergol mass is sufficient for the first Monergol partial mass injection at the location of the injector 20. A correspondingly smaller sized catalyzator ring sector 3' is therefore required. The second Monergol partial mass 21 can amount to a maximum of about 22 percent of the entire Monergol mass in order to permit it to split by the gases 20a of the first Monergol partial mass 20. The gases 20a and 21a of the Monergol masses 20 and 21 are themselves capable of thermically separating the remaining 67 percent which is introduced in the form of a third Monergol partial mass 23.

The second catalyzator ring sector 16 performs a safety purpose inasmuch as they are intended to guarantee a complete separation of the Monergol masses 20 and 21 of the first and second Monergol partial injections 20 and 21 under maximum conditions which are to be the optimum of the installation to be obtained. It is possible, in theory, to keep the first catalyzator very small and to create all following processes purely thermically in the form of cascading admixtures of many partial Monergol masses. Practical considerations put a limit on the number of steps of injections. It lies entirely within the limits of the present invention that instead of a first Monergol partial mass such as the mass 10 or the mass 20 and which are chemically similar to the second and/or third Monergol masses 11 and 21 or 23, to use instead one which comprises the first Monergol mass 10 or 20 and then to add a chemically different second and/or third Monergol mass.

What is claims is:

1. A method for running a gas generator, especially for running rocket motors, comprising individually dividing a fluid Monergol mass into at least two separate Monergol partial masses, directing the first Monergol partial mass into association with a catalyst to catalytically separate the first fluid Monergol partial mass in an atomized state to form hot decomposed gases, moving the decomposed gases in a whirling flow around a central area of the gas generator, and mixing the other fluid Monergol partial mass by directing it into the whirling hot decomposed gases of the first Monergol partial mass so as to thermically split the other added Monergol partial mass.

2. A method, according to claim 1, wherein the entire Monergol mass is split into more than two fluid Monergol partial masses and wherein after the first Monergol partial mass is separated catalytically in an atomized state a second larger volume Monergol partial mass is added in the atomized state to the catalytically created decomposed gases of the first partial Monergol mass and it is split thermically thereby, and the next fluid Monergol partial mass is mixed in an atomized state to the hot gases produced by each of the first and second Monergol partial masses.

3. A method, according to claim 2, wherein the first and second Monergol partial masses after they are catalytically separated to form decomposed gases are again subjected to catalytic separation to insure that all of the atomized Monergol particles are decomposed.

4. A method, according to claim 1, wherein decomposed masses and the partial Monergol mass which is added to the decomposed gases are whirled together when admixed.

5. A method of operating a rocket engine using a combustion chamber having a catalyst therein, comprising discharging a first portion of a propellant component in a spray into the combustion chamber and directing the spray in a flow into association with the catalyst to generate high temperature gases and to create cracked gases moving the gases in a whirling flow around the central portion of the combustion chamber, and directing a second portion of a propellant component into mixing association with the whirling cracked gases in the same combustion chamber downstream of the introduction of the first portion to subject them to the high temperatures of the cracked gases and to thermally separate the second portion of said propellant component, and discharging the combined gases which are formed.

6. A method of operating a rocket engine using a combustion chamber having a catalyst therein, comprising discharging a first portion of a propellant component in a spray into the combustion chamber and directing the spray in a flow into association with the catalyst to generate high temperature gases and to create cracked gases, and directing a second portion of a propellant component into mixing association with the cracked gases in the same combustion chamber downstream of the introduction of the first portion to subject them to the high temperatures of the cracked gases and to thermally separate the second portion of said propellant component, and discharging the combined gases which are formed; wherein the first portion of the propellant component is directed outwardly into association with the catalyst and then is directed in a whirling inward flow within the combustion chamber, and directing the second portion of the propellant component into the whirling inward flow of the cracked gases.

7. A method of operating a rocket engine, according to claim 6, including injecting a third portion of the propellant component into association with the catalyst downstream of the first portion and then directing the gases after they pass into association with the catalyst and are cracked, into a central whirling stream, and introducing said second propellant component into the whirling stream of the cracked gases in the center of the combustion chamber.

8. A method of operating a rocket engine using a combustion chamber having a catalyst therein, comprising discharging a first portion of a propellant component in a spray into the combustion chamber and directing the spray in a flow into association with the catalyst to generate high temperature gases and to create cracked gases, and directing a second portion of a propellant component into mixing association with the whirling cracked gases in the same combustion chamber downstream of the introduction of the first portion to subject them to the high temperatures of the cracked gases and to thermally separate the second portion of said propellant component, and discharging the combined gases which are formed, and wherein after the second propellant component portion is directed into association with the cracked gases, the combined gases are directed in an axial direction and are thereafter discharged in a reverse flow axial direction.

* * * * *